(12) United States Patent
Bernard

(10) Patent No.: US 11,196,275 B1
(45) Date of Patent: Dec. 7, 2021

(54) COVER PLATE CHARGING STATION FOR ELECTRONIC DEVICES

(71) Applicant: Aaron Lee Bernard, Wilmington, DE (US)

(72) Inventor: Aaron Lee Bernard, Wilmington, DE (US)

( * ) Notice: Subject to any disclaimer, the term of this patent is extended or adjusted under 35 U.S.C. 154(b) by 120 days.

(21) Appl. No.: 16/416,436

(22) Filed: May 20, 2019

Related U.S. Application Data

(60) Provisional application No. 62/674,064, filed on May 21, 2018.

(51) Int. Cl.
*H01M 10/46* (2006.01)
*H02J 7/00* (2006.01)

(52) U.S. Cl.
CPC .................. *H02J 7/0044* (2013.01)

(58) Field of Classification Search
CPC ........ H02G 3/16; H02J 7/0044; H02J 7/0042; H02J 7/0027; H02J 7/025; H02J 7/0045
USPC .......... 320/107, 111, 114, 115; 220/3.2, 3.7, 220/3.8, 558, 241, 242, 244; D8/350, D8/351
See application file for complete search history.

(56) References Cited

U.S. PATENT DOCUMENTS

| | | | |
|---|---|---|---|
| 7,458,479 B1* | 12/2008 | Thompson | H02G 3/14 220/242 |
| 8,378,625 B2* | 2/2013 | Gourley | H02J 7/02 320/107 |
| 9,941,642 B1* | 4/2018 | Waggoner | H01R 24/76 |
| 2012/0049800 A1* | 3/2012 | Johnson | H02J 7/342 320/111 |
| 2015/0091522 A1* | 4/2015 | Byrne | H02J 7/0042 320/108 |
| 2017/0025886 A1* | 1/2017 | Rohmer | H02J 7/0044 |

* cited by examiner

*Primary Examiner* — Edward Tso
(74) *Attorney, Agent, or Firm* — Reed Smith LLP

(57) ABSTRACT

A cover plate charging station for electronic devices having a rear frame configured to be attached to a wall. The rear frame includes an opening configured to receive an electronic receptacle. A front frame is pivotally connected to the rear frame by a hinge assembly on bottom portions of the rear frame and the front frame. The front frame is configured to pivot downwardly and form a shelf capable of supporting at least one electronic device while connected to the electronic receptacle.

18 Claims, 11 Drawing Sheets

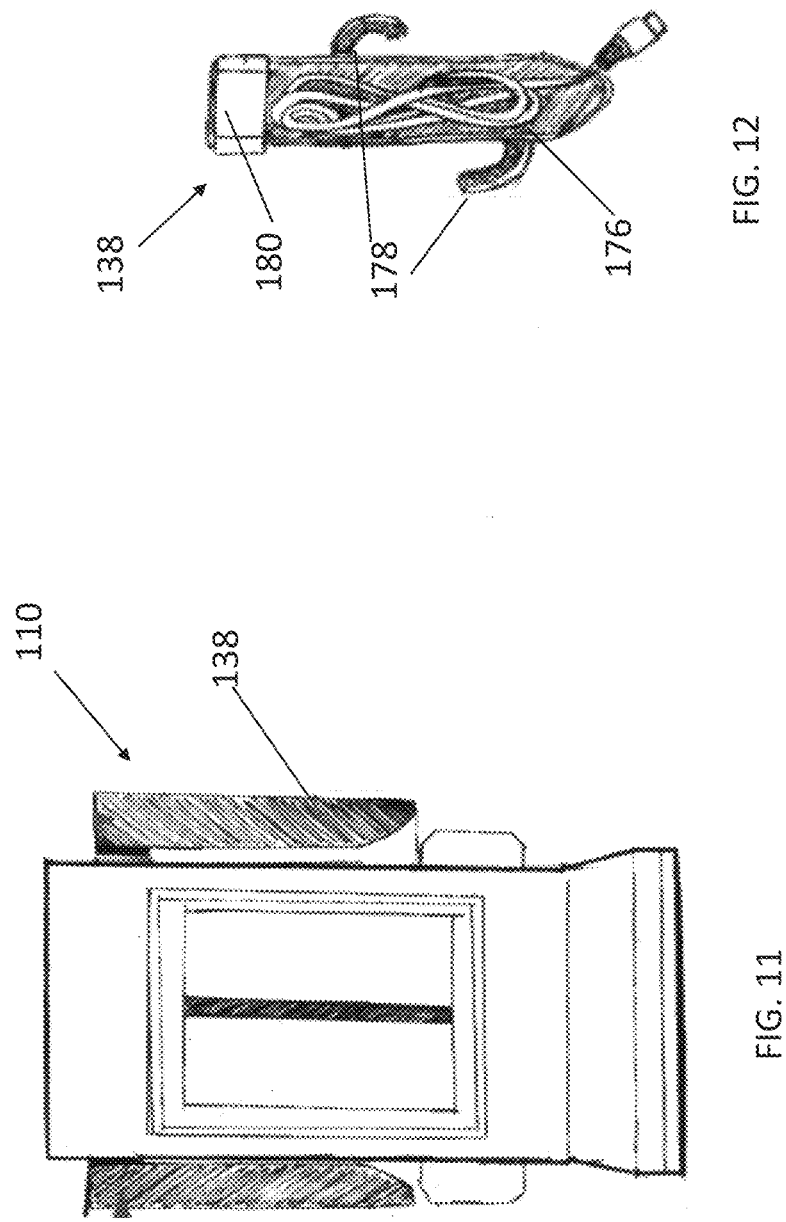

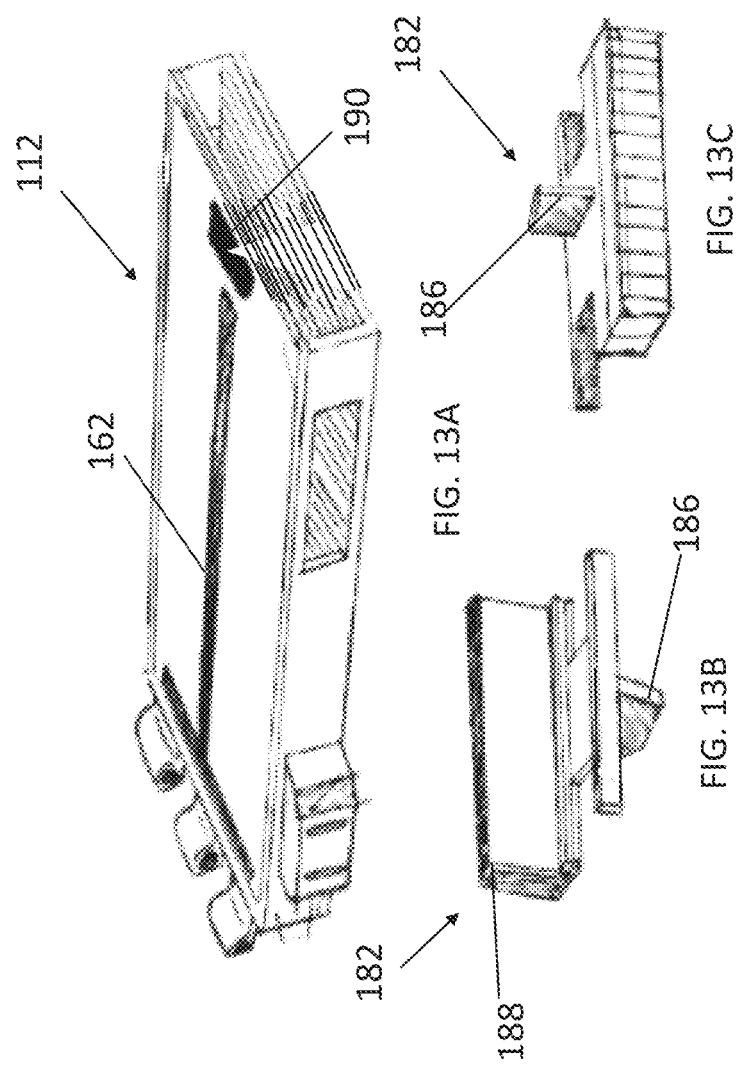
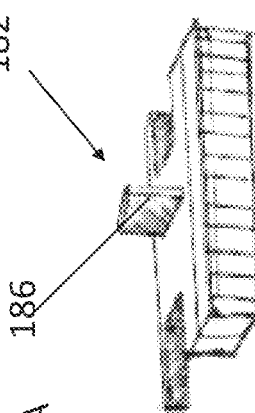
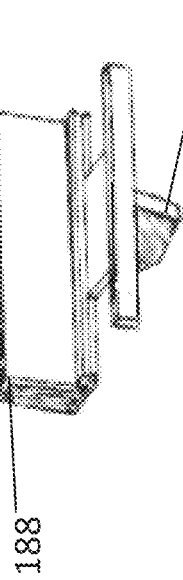
FIG. 13A
FIG. 13B
FIG. 13C

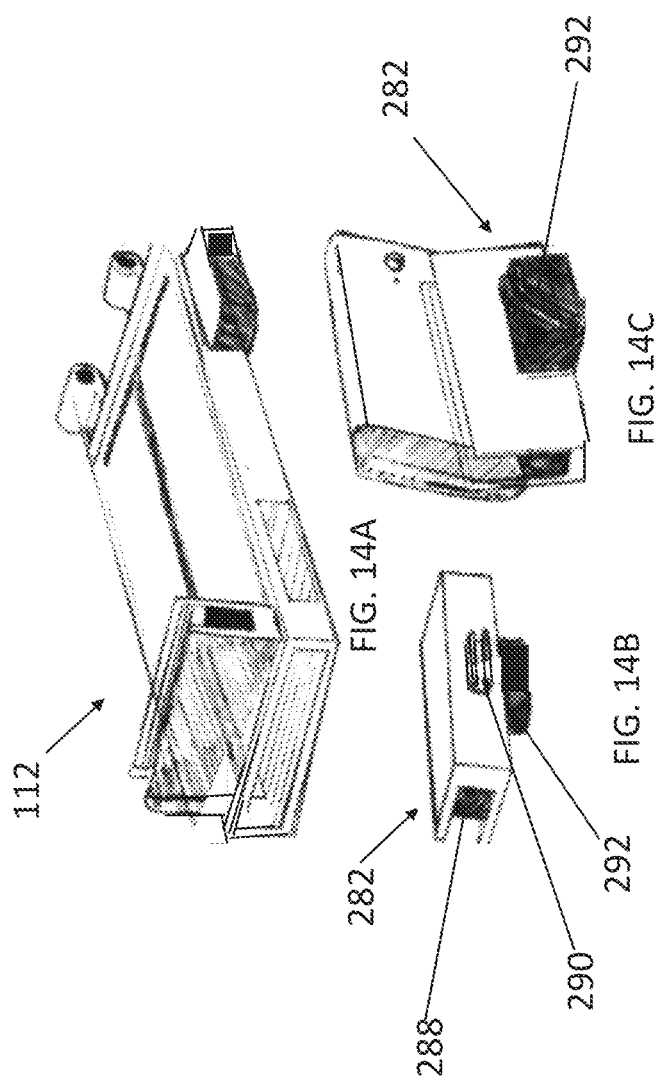

COVER PLATE CHARGING STATION FOR ELECTRONIC DEVICES

CROSS-REFERENCE TO RELATED APPLICATION

The present application claims the benefit of U.S. Provisional Application No. 62/674,064, filed May 21, 2018 the disclosure of which is herein incorporated by reference.

BACKGROUND

This application is related, generally and in various embodiments, to wall mounted charging stations for rechargeable electronic devices such as cell phones.

Rechargeable electronic devices such as cell phones, texting devices, pagers, music players, wireless headphones, portable speakers, handheld gaming devices need to be periodically connected to an electrical outlet to recharge their internal batteries. The electrical outlets are not always located near a horizontal surface to hold the rechargeable electronic devices while they are being charged. Standard electrical outlets have no way to minimize or organize the cord clutter associated with the rechargeable electronic devices. Also, the electrical outlet may not have enough socket receptacles to recharge all of the rechargeable electronic devices needed to be recharged at one time. A typical cover plate for an electrical outlet is a plate which covers an open electrical wall box and related wiring and provides openings for electrical receptacles and/or switches, but does not provide surfaces to hold electronic devices or organize cords. Improved devices for charging rechargeable electronic devices are needed.

BRIEF DESCRIPTION OF THE DRAWINGS

FIG. 11 shows a front view of another embodiment of a cover plate charging station.

FIG. 12 shows and interior view of the cord wrap of the embodiment of FIG. 11.

FIG. 13A shows a mar perspective view of another embodiment of the front frame.

FIGS. 13B and 13C show top and bottom perspective views of another embodiment of the viewing slot insert frame.

FIG. 14A shows a rear perspective view of another embodiment of the front frame.

FIGS. 14B and 14C show bottom and top perspective views of another embodiment of the viewing slot insert frame.

DETAILED DESCRIPTION

Figure 1:
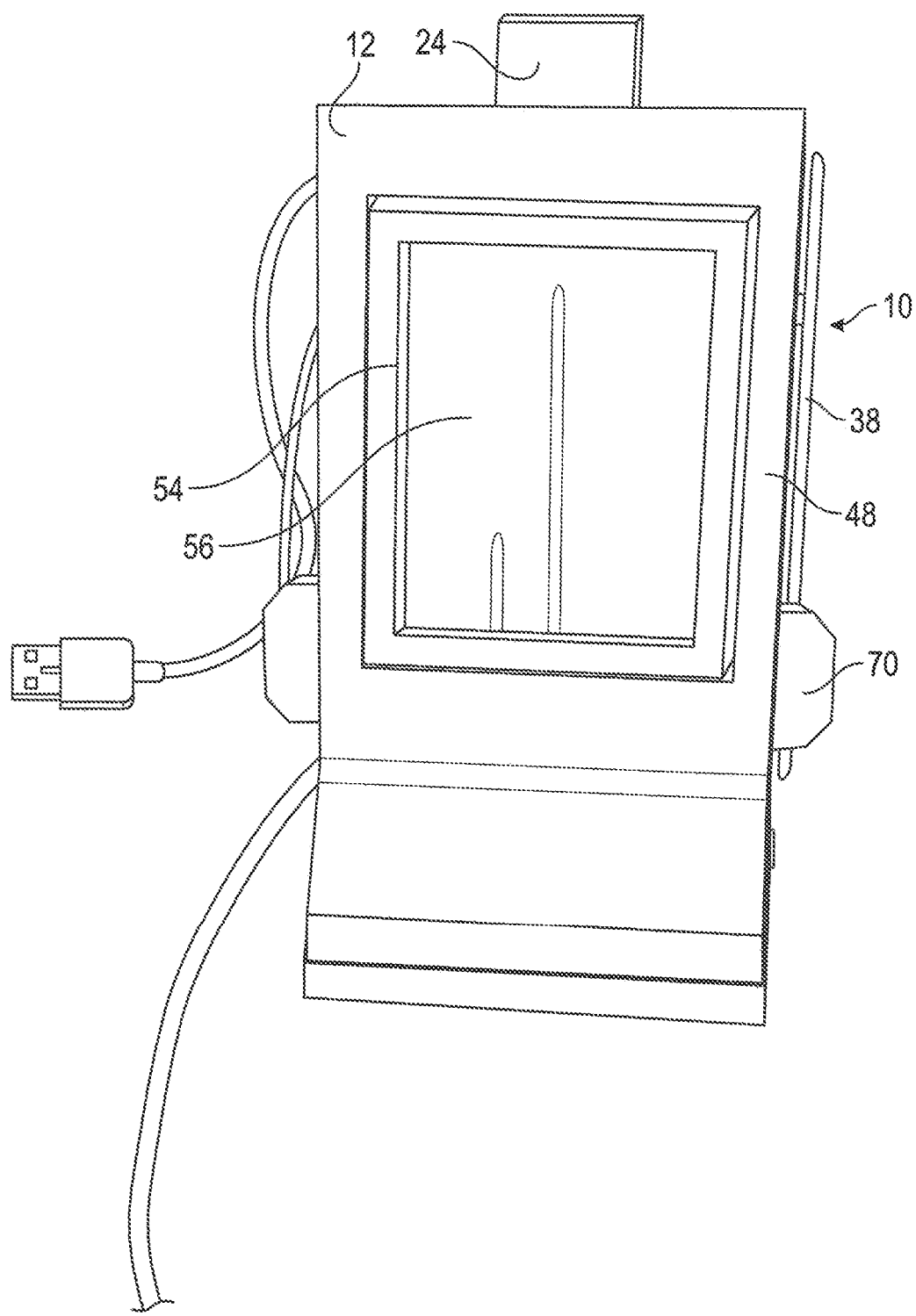
FIG. 1 is a front view of cover plate charging station on a wall according to an embodiment of the disclosed subject matter.
Figure 2:
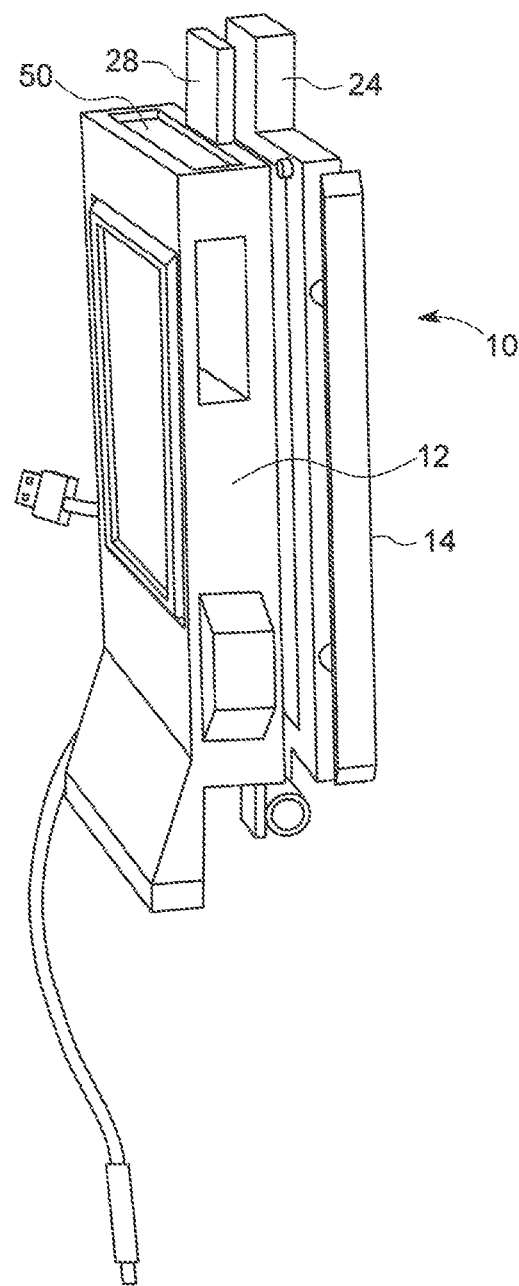
FIG. 2 shows a side perspective view of the cover plate charging station on a wall of FIG. 1.

It is to be understood that at least some of the figures and descriptions of the embodiments have been simplified to illustrate elements that are relevant for a clear understanding of the embodiments, while eliminating, for purposes of clarity, other elements that those of ordinary skill in the art will appreciate may also comprise a portion of the embodiments. However, because such elements are well known in the art, and because they do not facilitate a better understanding of the embodiments, a description of such elements is not provided herein.

Certain terminology is used in the following description for convenience only and is not limiting. The words "bottom," "top," "left," "right," "lower" and "upper" designate directions in the drawings to which reference is made. Unless specifically set forth herein, the terms "a." "an" and "the" are not limited to one element but instead should be read as meaning "at least one." The terminology includes the words noted above, derivatives thereof and words of similar import.

Referring to FIGS. 1-15, embodiments of a cover plate charging station for charging rechargeable electronic devices are shown. As used herein, the terms "electronic devices" and "rechargeable electronic devices" are intended to inclusively include such illustrative devices such as cell phones, texting devices, pagers, music players, wireless headphones, portable speakers, handheld gaming devices and other devices that need to be periodically connected to an electrical outlet to recharge their internal batteries.

An embodiment of a cover plate charging station 10 is shown in FIGS. 1-10. Cover plate charging station 10 has a front frame 12 pivotally connected to a rear frame 14 by a hinge assembly 16 (FIG. 4) on the bottom portions thereof. Front frame 12 and rear frame 14 are substantially rectangular in shape. Rear frame 14 is configured to be attached to a wall. Hinge assembly 16 includes two spaced apart tubular loops 18 (FIG. 5) on the bottom portion of rear frame 14 which are disposed between three spaced tubular loops 20 (FIG. 7) on the bottom portion of front frame 12. A hinge pin 22 (FIG. 4) is received in the tubular loops 18, 20 and allows front frame 12 to pivot downwardly and lock at a 90° angle to rear frame 14.

Rear frame 14 includes a tab portion 24 protruding from an upper portion thereof. Tab portion 24 includes a magnet 26 which interacts with a metal plate on a tab portion 28 on an upper portion of front frame 12 to separably lock front frame 12 to rear frame 14. Rear frame 14 further has at least one rubber cushion 30 (FIG. 3) on an upper portion thereof for cushioning closure of front frame 12 against rear frame 14.

Rear frame 14 includes a substantially rectangular shaped opening 32 to allow of protrusion of electrical receptacles 34 which may include USB ports and/or switches located within an electrical box (not shown) being covered by cover plate charging station 10.

Rear frame 14 further may include a cord wrap 38 (FIG. 5) on either side thereof. Each cord wrap 38 includes a narrow winding plate 40 which is spaced from the respective side of rear frame 14 by a pair of spaced knobs 42. Cords from the electronic devices may be wrapped around the knobs 42 between winding plate 40 and the side of rear frame 14.

Figure 3:
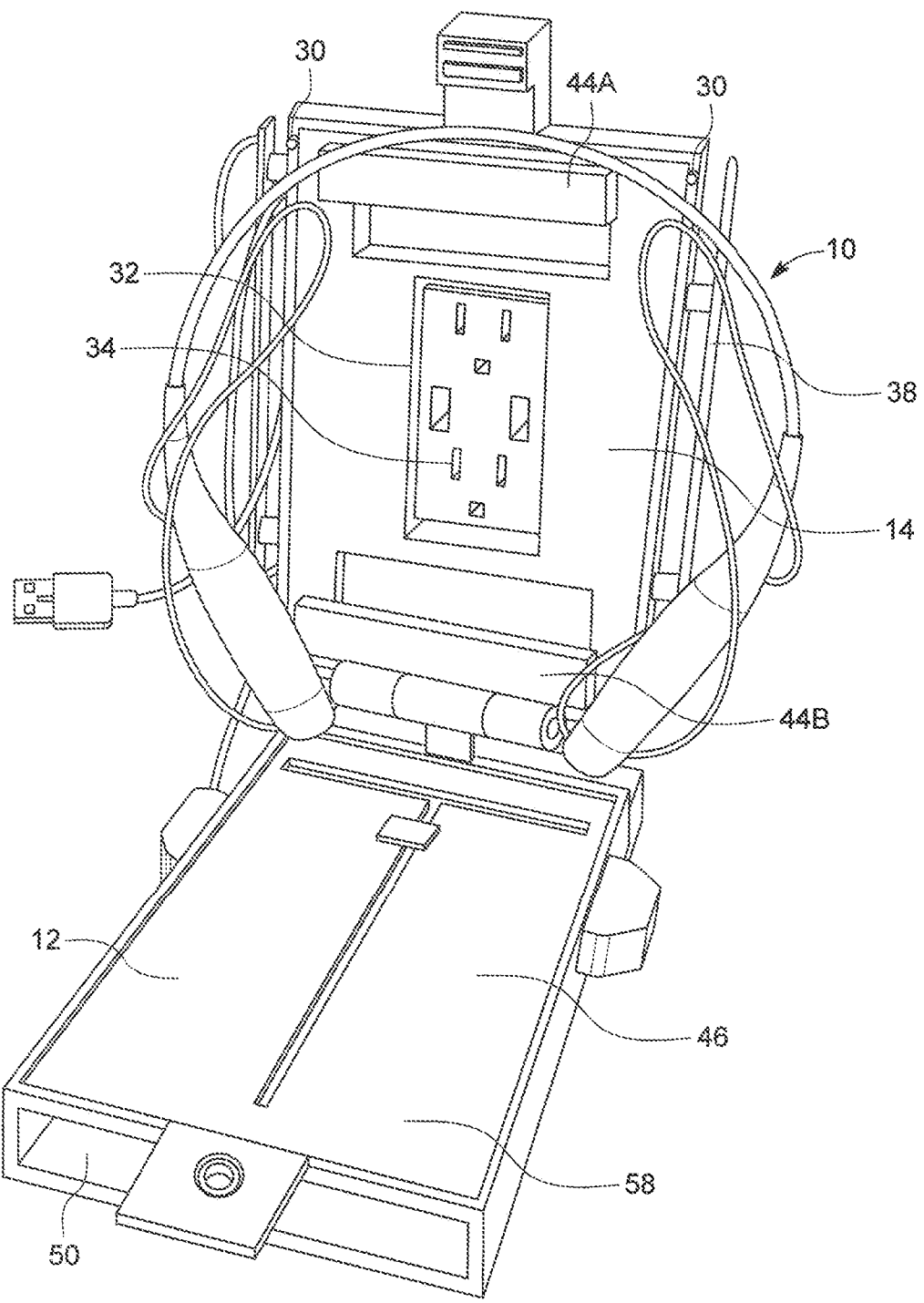
FIG. 3 shows a front perspective view of the cover plate charging station of FIG. 1 in an open position.
Figure 4:
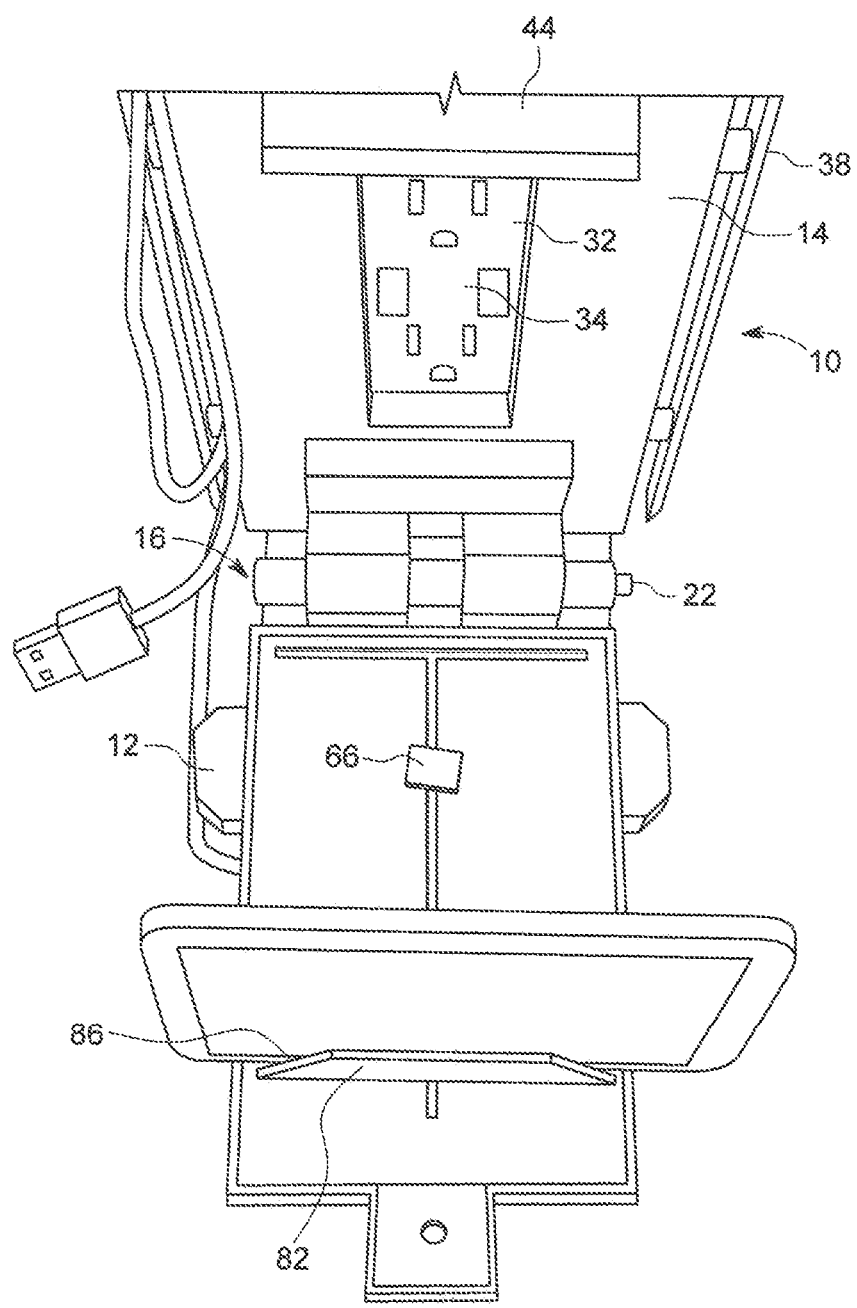
FIG. 4 shows a front perspective view of the cover plate charging station of FIG. 1 in an open position.
Figure 6:
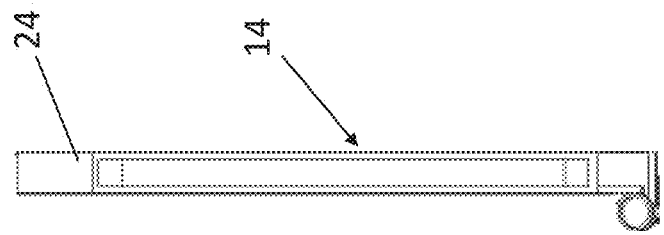
FIG. 6 is a side view of the rear frame of the cover plate charging station of FIG. 1.
Figure 5:
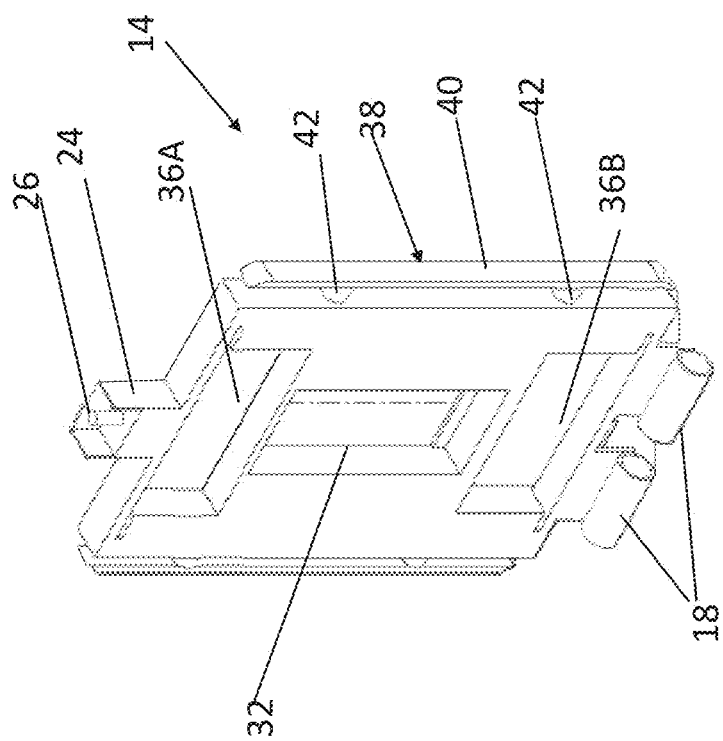
FIG. 5 is a perspective view of the rear frame of the cover plate charging station of FIG. 1.
Figure 7:
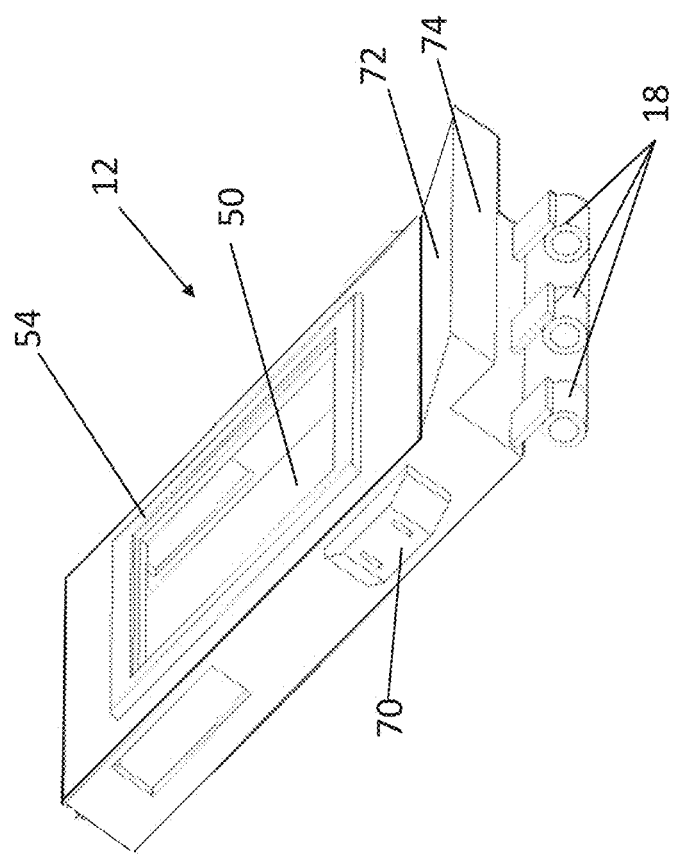
FIG. 7 is a perspective view of the front frame of the cover plate charging station of FIG. 1.
Figure 8:
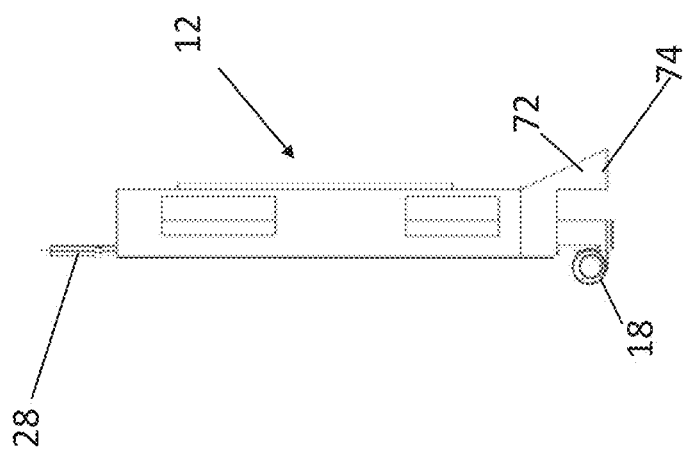
FIG. 8 is a side view of the front frame of the cover plate charging station of FIG. 1.
Figure 10:
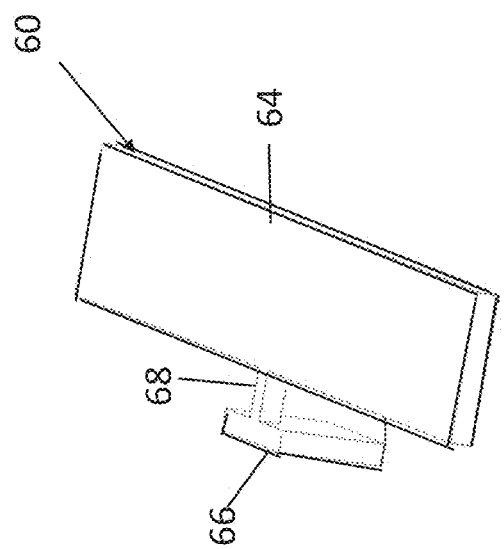
FIG. 10 is a perspective view of the front frame slider of the cover plate charging station of FIG. 1.
Figure 9:
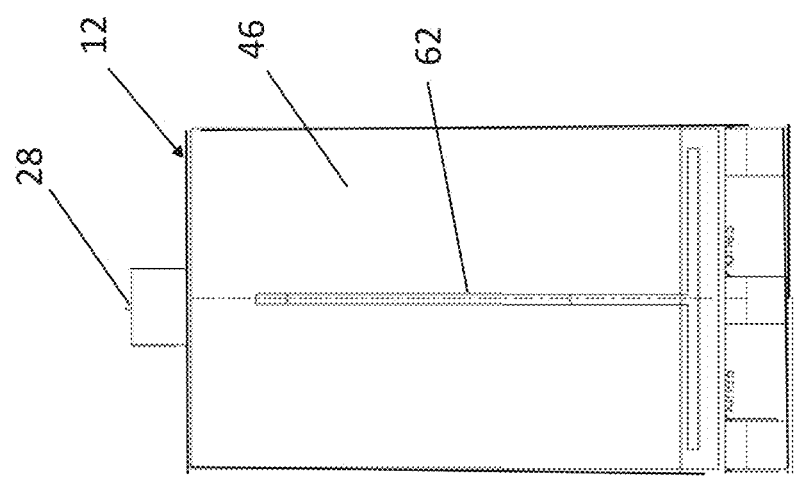
FIG. 9 is a rear view of the front frame of the cover plate charging station of FIG. 1.

Rear frame 14 may further may include an upper headphone pull up placement shelf 44A and a lower pull up placement shelf 44B (FIGS. 3-4). Upper headphone pull up placement shelf 44A is slidingly received in a rectangular opening 36A in an upper portion of rear frame 14. Lower headphone pull up placement shelf 44B is slidingly received in a rectangular opening 36B in a lower portion of rear frame 14. See FIG. 5. The headphone pull up placement shelfs 44A and 44B allow for the temporary storage of a user's headphones.

Front frame 12 has a rear side 46, a front side 48 and includes an interior pocket 50 which is open at a top portion thereof to allow insertion of an electronic device such as cell phone. Front side 48 has a viewing opening 54 which allows an electronic device held within interior pocket 50 to be viewed. Viewing opening 54 may be covered by a transparent screen 56.

The rear side 46 of front frame 12 is padded with, for example, a non-skid rubber pad 58 (FIG. 3) to act as a cushion for electronic devices held on front frame 12 for when front frame 12 is pivoted downwardly to form a shelf.

The rear side 46 of front frame 12 further includes a central slot 62 (FIG. 9) which allows a removal slide 60 (FIG. 10) to remove an electronic device held within interior pocket 50. Removal slide 60 includes a rectangular slider portion 64 contained within interior pocket 50 and slidable back and forth within interior pocket 50. Removal slide 60 further includes a tab portion 66 disposed on the rear side 46 of front frame 12. Tab portion 66 is connected to slider portion 64 by a connecting portion 68 which is slidable back and forth within central slot 62 such that when a user moves tab portion 66 (FIG. 4) forward, rectangular slider portion 64 will move forward an electronic device contained within interior pocket 50.

Referring to FIG. 4, a phone slot insert frame 82 which has a projection (not shown) which may be inserted into a slot 84 (FIG. 9) on front frame 12. Slot insert frame 82 has a groove 86 which is configured to hold a cell phone.

Front frame 12 further includes a pyramid plug frame 70 (FIG. 7) on either side which serve as holders for plugs of rechargeable electronic devices or their wall chargers for temporary storage purposes.

Front frame 12 further includes a stopper projection 72 (FIG. 7) disposed on a bottom portion thereof. Stopper projection 72 has a stopper surface 74 which is configured to interact with the wall to support front frame 12 at a 90° angle to rear frame 14. Stopper projection 72 is preferably rubber.

The lower portion the front side 48 of front frame 12 may further include an additional charging outlet or a night light (not shown).

Cover plate charging station 10 is configured to be used in many ways. For example, cover plate charging station 10 may be mounted to an electrical receptacle 34 which includes a single electrical outlet and an electrical switch allowing for the charging of a single rechargeable electronic device. Cover plate charging station 10 may be mounted to an electrical receptacle 34 which includes two electrical outlets and two USB outlets for the charging up to four rechargeable electronic devices. For example, when charging multiple devices, a cell phone may be disposed in pocket 50, a rechargeable speaker may be placed on the non-skid rubber pad 58, and rechargeable headphones may be placed on the upper headphone pull up placement shelf 44A.

FIGS. 11-14 show an alternative embodiment of cover plate charging station 110. In this embodiment, cord wraps 138 are removeably attached with magnets 180. A cable 176 for a rechargeable electronic device is secured with hook and loop type fasteners 178 to hold it in place while it is nestled into the interior of cord wraps 138 for temporary storage.

FIGS. 13A-13C show another embodiment of the phone slot insert frame 182 which has a projection 186 which may be inserted into slot 162 on front frame 112. Slot insert frame 182 has a groove 188 which is configured to hold a cell phone.

FIGS. 14A-14C show another embodiment of the phone slot insert frame 282 which has a magnet 186 on the bottom thereof which may removeably attach to a metal piece 190 (FIG. 13A) on front frame 112. Slot insert frame 282 has a groove 288 which is configured to hold a cell phone. Slot insert frame 282 may be free standing and further has a support block 292 on a rear portion thereof.

Figure 15:
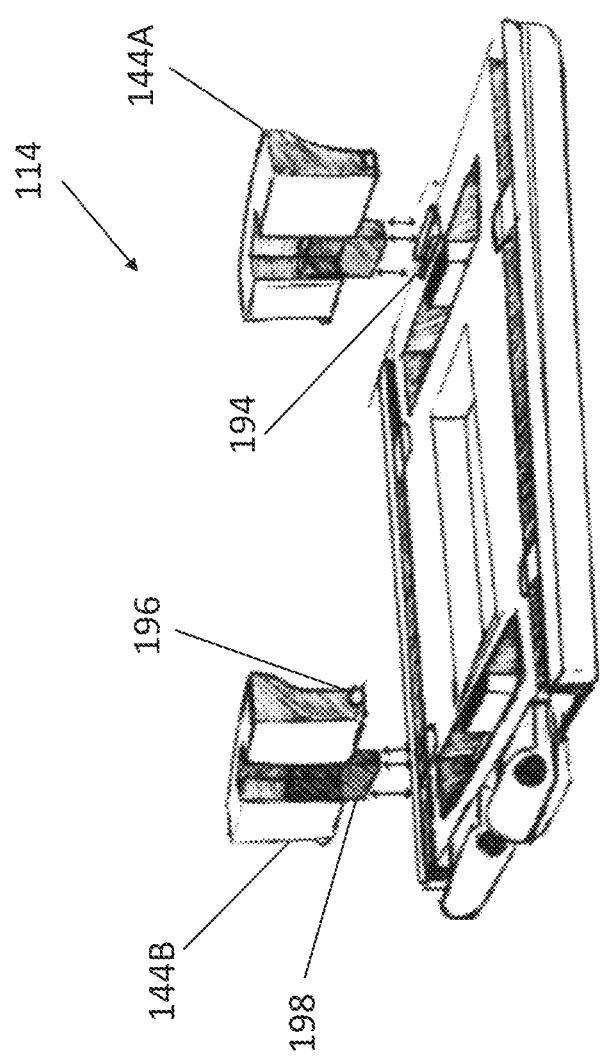
FIG. 15 shows a front perspective view of another embodiment of the rear frame.

FIG. 15 shows another embodiment of rear frame 114 with ball and socket flip up top and bottom shelves 144A, 144B with middle offset to allow for slide lock 198 usage. Headphones may be stored on top shelf 144A while watch and health monitors may be stored on bottom shelf 144B. Top and bottom shelves 144A, 144B further have ball hinges 196 on either side. In this embodiment of front frame 112 and rear frame 114, there are no tab portions. Metal piece 190 on front frame 112 cooperates with a magnet 194 on rear frame 114 when in a closed position.

Nothing in the above description is meant to limit the embodiments to any specific formulation, calculation, or methodology. Many formulation, calculation and methodology substitutions are contemplated within the scope of the embodiments and will be apparent to those skilled in the art. The embodiments described herein were presented by way of example only and should not be used to limit the scope of the embodiments.

Although the embodiments has been described in terms of particular embodiments in this application, one of ordinary skill in the art, in light of the teachings herein, can generate additional embodiments and modifications without departing from the spirit of, or exceeding the scope of, the described embodiments. Accordingly, it is understood that the drawings and the descriptions herein are proffered only to facilitate comprehension of the embodiments and should not be construed to limit the scope thereof.

What is claimed is:

1. A cover plate charging station for electronic devices comprising:
    a rear frame configured to be attached to a wall, wherein the rear frame comprises an opening configured to receive an electronic receptacle; and
    a front frame pivotally connected to the rear frame by a hinge assembly on bottom portions of the rear frame and the front frame, wherein the front frame is configured to pivot downwardly and form a shelf capable of supporting at least one electronic device while connected to the electronic receptacle;
    wherein the rear frame further comprises at least one pull up placement shelf, configured to be pulled up relative to the rear frame by a user.

2. The cover plate charging station of claim 1, wherein the hinge assembly comprises spaced apart tubular loops on the bottom portion of the rear frame, spaced apart tubular loops on the bottom portion of the front frame, and a hinge pin received in the tubular loops.

3. The cover plate charging station of claim 1, wherein a top portion of one of the rear frame and the front frame has a magnet portion which is configured to be separably locked to a metal portion on a top portion of the other of the one of the rear frame and the front frame.

4. The cover plate charging station of claim 3, wherein the magnet portion and the metal portion are each on a tab portion on the top portions of the rear frame and the front frame.

5. The cover plate charging station of claim 1, further comprising at least one cord wrap frame attached to the rear frame, wherein the at least one cord wrap frame is configured to receive a cord from an electronic device.

6. The cover plate charging station of claim 5, wherein the at least one cord wrap is removably attached to the rear frame.

7. The cover plate charging station of claim 6, wherein the at least one cord wrap is removably attached to the rear frame by at least one magnet on at least one of the rear frame and the cord wrap frame.

8. A cover plate charging station for electronic devices comprising:
   a rear frame configured to be attached to a wall, wherein the rear frame comprises an opening configured to receive an electronic receptacle; and
   a front frame pivotally connected to the rear frame by a hinge assembly on bottom portions of the rear frame and the front frame, wherein the front frame is configured to pivot downwardly and form a shelf capable of supporting at least one electronic device while connected to the electronic receptacle;
   wherein the rear frame further comprises at least one pull up placement shelf, wherein the pull up placement shelf is configured to receive headphones.

9. The cover plate charging station of claim 1, wherein the rear frame comprises two pull up placement shelves, wherein at least one of the pull up placement shelves is configured to receive headphones.

10. The cover plate charging station of claim 1, wherein the front frame further includes a stopper projection disposed on the bottom portion of the front frame, wherein the stopper projection has a stopper surface is configured to interact with the wall to support the front frame at a substantially 90° angle to the rear frame.

11. A cover plate charging station for electronic devices comprising:
    a rear frame configured to be attached to a wall, wherein the rear frame comprises an opening configured to receive an electronic receptacle; and
    a front frame pivotally connected to the rear frame by a hinge assembly on bottom portions of the rear frame and the front frame, wherein the front frame is configured to pivot downwardly and form a shelf capable of supporting at least one electronic device while connected to the electronic receptacle;
    wherein the front frame comprise a rear side, a front side and an interior pocket between the rear side and the front side, wherein interior pocket is open at a top portion thereof and is configured to receive an electronic device.

12. The cover plate charging station of claim 11, wherein the front side of the front frame has a viewing opening configured to allows an electronic device held within the interior pocket to be viewed.

13. The cover plate charging station of claim 11, wherein the rear side of front frame is padded with a non-skid rubber pad.

14. The cover plate charging station of claim 11, wherein the rear side of front frame further comprises a central slot.

15. The cover plate charging station of claim 14, further comprising a removal slide disposed within the interior pocket, wherein the removal slide has a tab portion extendable through the central slot and configured to be moved forward by a user to cause the removal slide to move an electronic device disposed within the interior pocket.

16. The cover plate charging station of claim 14, further comprising a slot insert frame having a groove which is configured to hold a cell phone, wherein the slot insert frame is insertable into the central slot.

17. The cover plate charging station of claim 14, further comprising a slot insert frame having a groove which is configured to hold a cell phone, wherein the slot insert frame is configured to be removably attached to the front frame by at least one magnet disposed on the slot insert frame.

18. A cover plate charging station for electronic devices comprising:
    a rear frame configured to be attached to a wall, wherein the rear frame comprises an opening configured to receive an electronic receptacle;
    a front frame pivotally connected to the rear frame by a hinge assembly on bottom portions of the rear frame and the front frame, wherein the front frame is configured to pivot downwardly and form a shelf capable of supporting at least one electronic device while connected to the electronic receptacle; and
    at least one plug frame disposed on the front frame configured for plugs of the electronic devices to be inserted into the at least one plug frame for storage.

* * * * *